United States Patent
Chen

(10) Patent No.: US 11,340,666 B2
(45) Date of Patent: May 24, 2022

(54) DATA STORAGE DEVICE FIXING STRUCTURE AND CABINET

(71) Applicant: Fulian Precision Electronics (Tianjin) Co., LTD., Tianjin (CN)

(72) Inventor: Hung-Wei Chen, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/022,379

(22) Filed: Sep. 16, 2020

(65) Prior Publication Data

US 2022/0050509 A1 Feb. 17, 2022

(30) Foreign Application Priority Data

Aug. 17, 2020 (CN) .......................... 202010827241.9

(51) Int. Cl.
| | |
|---|---|
| *G06F 1/18* | (2006.01) |
| *G06F 1/16* | (2006.01) |
| *G11B 5/82* | (2006.01) |
| *G11B 33/12* | (2006.01) |

(52) U.S. Cl.
CPC ............ *G06F 1/187* (2013.01); *G06F 1/1658* (2013.01); *G06F 1/1677* (2013.01); *G11B 5/82* (2013.01); *G11B 33/124* (2013.01)

(58) Field of Classification Search
CPC ......... G06F 1/187; G06F 1/1658; G11B 5/82; G11B 33/124
See application file for complete search history.

(56) References Cited

U.S. PATENT DOCUMENTS

| | | | | |
|---|---|---|---|---|
| 8,971,036 B1* | 3/2015 | Lau | ........................ | G06F 1/187 |
| | | | | 361/679.36 |
| 9,785,206 B2* | 10/2017 | Lo | ........................... | G06F 1/187 |
| 2005/0116135 A1* | 6/2005 | Peng | .................... | G11B 33/124 |
| | | | | 248/694 |
| 2005/0195564 A1* | 9/2005 | Peng | .................... | G11B 33/124 |
| | | | | 361/679.31 |
| 2006/0034048 A1* | 2/2006 | Xu | ....................... | G11B 33/128 |
| | | | | 361/679.32 |
| 2007/0235625 A1* | 10/2007 | Liang | ..................... | G06F 1/187 |
| | | | | 248/675 |
| 2007/0268662 A1* | 11/2007 | Zhang | .................... | G06F 1/187 |
| | | | | 361/679.31 |
| 2012/0169198 A1* | 7/2012 | Jiang | ...................... | G06F 1/183 |
| | | | | 312/333 |

(Continued)

FOREIGN PATENT DOCUMENTS

TW I511645 B 12/2015

*Primary Examiner* — Nidhi Thaker
(74) *Attorney, Agent, or Firm* — ScienBiziP, P.C.

(57) ABSTRACT

A data storage device fixing structure includes a mounting frame, a resisting member, and a limiting member. The resisting member is movably arranged on the mounting frame and configured to resist a data storage device. The resisting member includes a resisting portion. The limiting member is provided on the resisting member and provided with a fixing portion. The fixing portion extends into the data storage device located in the mounting frame to fixedly mount the data storage device. When the limiting member is moved, the fixing portion is separated from the data storage device, the resisting member is pulled, and the resisting portion drives the data storage device to move.

16 Claims, 8 Drawing Sheets

(56) References Cited

U.S. PATENT DOCUMENTS

| | | | | |
|---|---|---|---|---|
| 2014/0139993 A1* | 5/2014 | Liu | ................... | G11B 33/128 |
| | | | | 361/679.31 |
| 2014/0268540 A1* | 9/2014 | Peng | ................... | G11B 33/124 |
| | | | | 361/679.37 |
| 2014/0345105 A1* | 11/2014 | Brockett | ................ | G06F 1/181 |
| | | | | 29/428 |

* cited by examiner

DATA STORAGE DEVICE FIXING STRUCTURE AND CABINET

FIELD

The subject matter herein generally relates to data storage device fixing structures, and more particularly to a data storage device fixing structure and a cabinet using the data storage device fixing structure.

BACKGROUND

In a large data room, many cabinets are usually set up to supply network information. Data storage devices, such as hard disks, magnetic disks, and the like are mounted in the cabinets. The data storage devices are generally inserted into connectors. The data storage devices are fixedly mounted in the mounting frame by screws, and then the mounting frame is fixed in the cabinet. However, if the data storage devices need to be removed, disassembly is inconvenient.

BRIEF DESCRIPTION OF THE DRAWINGS

Implementations of the present disclosure will now be described, by way of embodiments, with reference to the attached figures.

DETAILED DESCRIPTION

Figure 1:
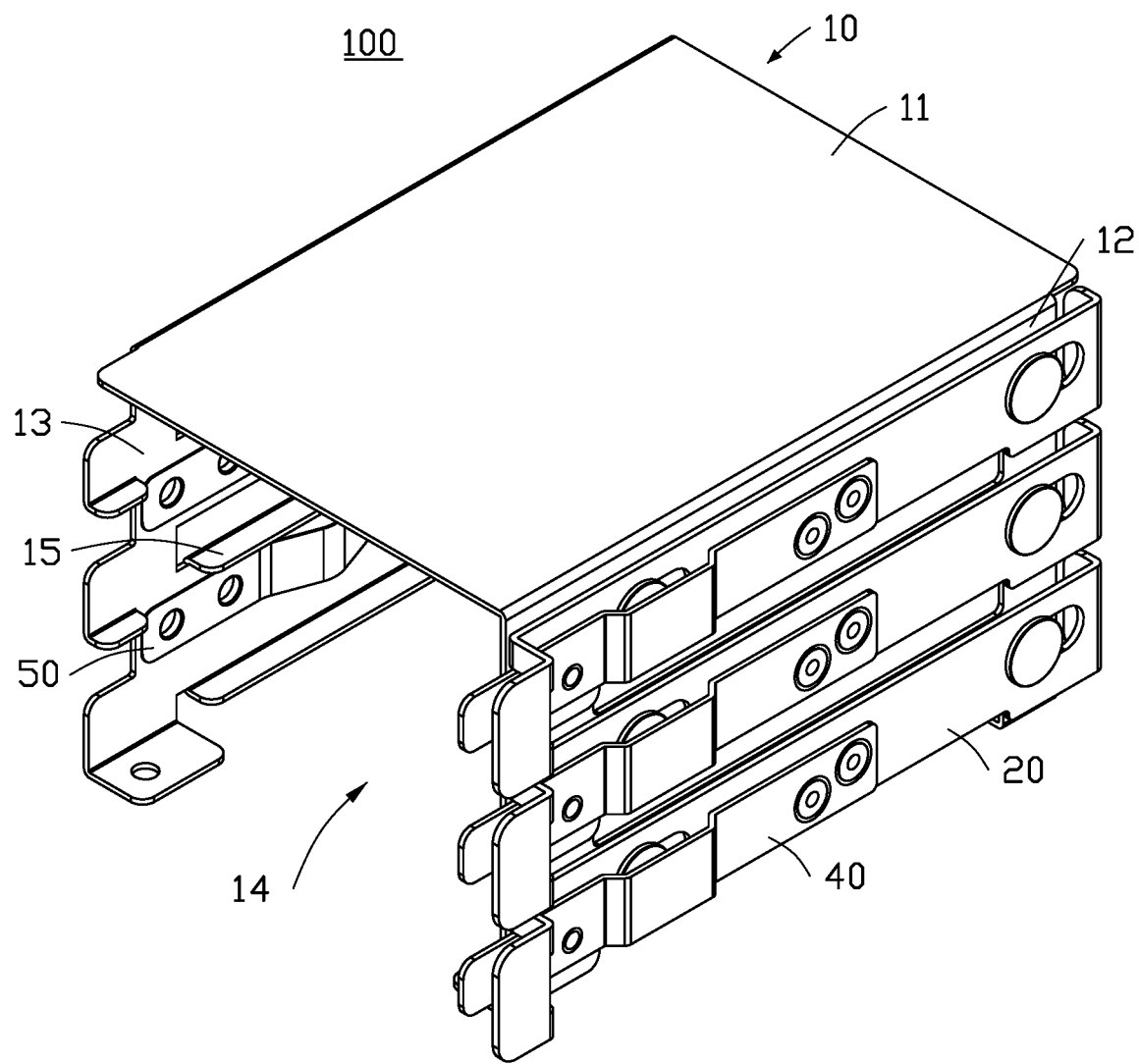
FIG. 1 is a schematic perspective diagram of an embodiment of a data storage device fixing structure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably connected. The term "substantially" is defined to be essentially conforming to the particular dimension, shape, or another word that "substantially" modifies, such that the component need not be exact. For example, "substantially cylindrical" means that the object resembles a cylinder but can have one or more deviations from a true cylinder. The term "comprising" means "including, but not necessarily limited to"; it specifically indicates open-ended inclusion or membership in a so-described combination, group, series, and the like.

Figure 2:
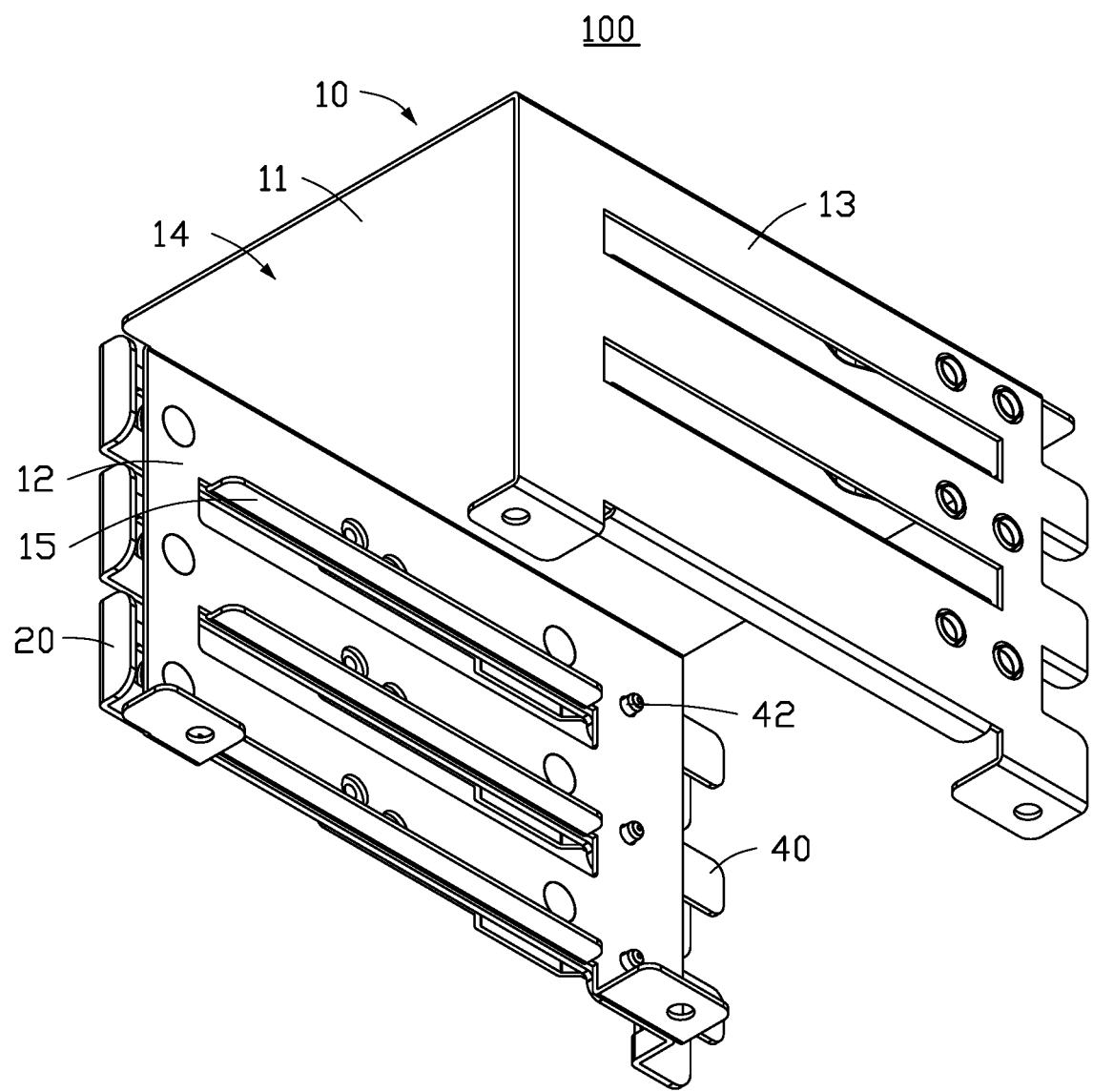
FIG. 2 is similar to FIG. 1, but shown from another angle.

FIGS. 1 and 2 show an embodiment of a data storage device fixing structure 100 including a mounting frame 10, a resisting member 20, and a limiting member 40. The resisting member 20 is movably arranged on the mounting frame 10. The resisting member 20 is provided with a resisting portion 24 for resisting a data storage device 200. The limiting member 40 is provided on the resisting member 20 and provided with a fixing portion 42 extending into the data storage device 200 located in the mounting frame 10 to fix the data storage device 200. When the data storage device 200 is to be disassembled, the limiting member 40 is moved, the fixing portion 42 is separated from the data storage device 200, the resisting member 20 is pulled, and the resisting portion 24 drives the data storage device 200 to move to unlock the data storage device 200.

Figure 3:
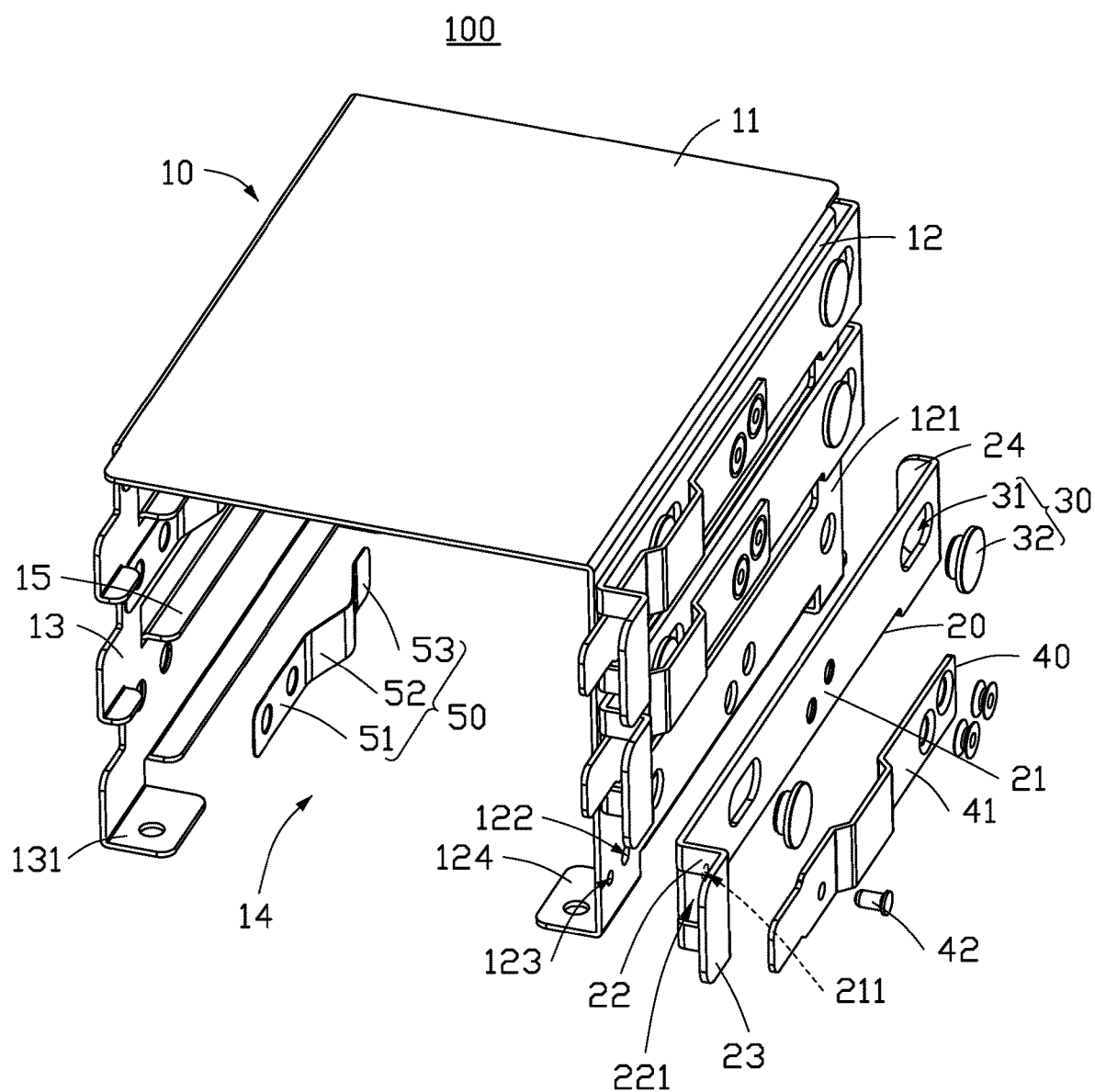
FIG. 3 is an exploded perspective diagram of the data storage device fixing structure.

Referring to FIG. 3, the mounting frame 10 includes a cover 11, a first side plate 12, and a second side plate 13. The first side plate 12 and the second side plate 13 are respectively arranged on opposite sides of the cover 11, and the first side plate 12 and the second side plate 13 are substantially perpendicular to the cover 11, so that the mounting frame 10 is substantially a "U"-shaped structure with an opening. An accommodating space 14 formed by the cover 11, the first side plate 12, and the second side plate 13 is used for accommodating the data storage device 200.

In one embodiment, the cover 11, the first side plate 12, and the second side plate 13 may be an integrally formed structure.

The first side plate 12 includes a mounting plate 121, and the mounting plate 121 is fixedly coupled to the cover 11. The mounting plate 121 defines a first fixing hole 122, and the fixing portion 42 of the limiting member 40 can extend into the first fixing hole 122.

The mounting plate 121 is further provided with a positioning portion 123 located adjacent to the first fixing hole 122 and approximately located at an edge of the mounting plate 121. In FIG. 3, the positioning portion 123 is provided at a front edge of the mounting plate 121, and the first fixing hole 122 is located at a rear end of the positioning portion 123. In one embodiment, the positioning portion 123 is a concave circular groove, which is adapted to the fixing portion 42 of the limiting member 40 to limit movement of the fixing portion 42. It can be understood that, in other embodiments, the positioning portion 123 can also be replaced with other structures, such as a groove with a guiding inclined surface.

The mounting frame 10 further includes a support plate 15 provided on an inner side of the first side plate 12 and the second side plate 13 for supporting the data storage device 200.

Ends of the first side plate 12 and the second side plate 13 away from the cover 11 are respectively provided with mounting portions 124, 131. By setting screws, studs, or other fasteners in the mounting portions 124, 131, the mounting frame 10 is fixedly mounted in a cabinet 1.

In one embodiment, a plurality of the resisting members 20 and a plurality of the limiting members 40 can be provided on the first side plate 12, so that a plurality of data storage devices 200 can be fixedly mounted in the mounting frame 10. In one embodiment, the first side plate 12 is provided with three resisting members 20 and three limiting members 40. It can be understood that, in other embodiments, the number of the resisting members 20 and the limiting members 40 is not limited to this.

Referring to FIG. 3, the resisting member 20 is provided on an outer side of the mounting plate 121. Specifically, the resisting member 20 includes a first body 21, a connecting portion 22, an operating portion 23, and the resisting portion 24. Two ends of the connecting portion 22 are respectively coupled to the first body 21 and the operating portion 23, and the resisting portion 24 is provided at an end of the first body 21 away from the operating portion 23.

Specifically, the first body 21 defines a second fixing hole 211 corresponding to the first fixing hole 122, and the fixing portion 42 of the limiting member 40 passes through the second fixing hole 211.

Referring to FIG. 3, the connecting portion 22 is provided at the front end of the first body 21 and is substantially perpendicular to the first body 21. The operating portion 23 is substantially parallel to the first body 21 and extends toward the front end of the first body 21. The resisting portion 24 is arranged at the rear end of the first body 21 and is substantially perpendicular to the first body 21 and extends in a direction adjacent to the data storage device 200 to resist the data storage device 200.

The connecting portion 22 defines a through hole 221, and the limiting member 40 passes through the through hole 221.

In one embodiment, the first body 21, the connecting portion 22, the operating portion 23, and the resisting portion 24 may be an integrally formed structure.

Referring to FIG. 3, the data storage device fixing structure 100 further includes a sliding structure 30. The sliding structure 30 is provided on the first side plate 12 and the resisting member 20 so that the resisting member 20 can move on the first side plate 12.

Specifically, the sliding structure 30 includes a sliding groove 31 and a protrusion 32. The sliding groove 31 is defined in the first body 21 of the resisting member 20. The protrusion 32 is provided on the mounting plate 121 of the first side plate 12, such that the protrusion 32 is received in the sliding groove 31. The sliding groove 31 defines a moving direction of the resisting member 20.

In one embodiment, the first body 21 defines two sliding grooves 31 extending along a front-rear direction (parallel to a length of the resisting member 20). Correspondingly, two protrusions 32 are provided on the mounting plate 121 to cause the resisting member 20 to move more stably. It can be understood that, in other embodiments, the sliding groove 31 may also be defined in the mounting plate 121, and the protrusion 32 may be provided on the first body 21, so that the resisting member 20 can move on the first side plate 12. Moreover, the number of the sliding grooves 31 and the protrusions 32 is not limited to this and can be set of the length of the first body 21. If the distance of the first body 21 in the front-rear direction is longer, then more sliding grooves 31 and/or protrusions 32 can be provided.

Referring to FIG. 3, the limiting member 40 is located on a surface of the resisting member 20 facing away from the first side plate 12. The limiting member 40 includes a second body 41, and the second body 41 is fixedly mounted on the resisting member 20. The fixing portion 42 is located on the second body 41 adjacent to the front end of the second body 41. The fixing portion 42 passes through the first fixing hole 122 and the second fixing hole 211 to extend into the data storage device 200 in the mounting frame 10 to fixedly mount the data storage device 200.

The resisting member 20 and the limiting member 40 can be elastically deformed, so that operation of the limiting member 40 can drive the fixing portion 42 to extend into or out of the data storage device 200. Further, the resisting member 20 and the limiting member 40 are sheet metal parts. It can be understood that, in other embodiments, the resisting member 20 and the limiting member 40 may also be made of other materials having similar effects.

Referring to FIG. 3, the data storage device fixing structure 100 further includes a resilient member 50 located on an inner side of the second side plate 13 at an upper end of the support plate 15. A distance between the resilient member 50 and the support plate 15 is a height distance of the data storage device 200. When the data storage device 200 is supported on the support plate 15, a lower edge of the resilient member 50 resists the data storage device 200.

The resilient member 50 includes a fixed end 51, a protruding portion 52, and a free end 53. Two ends of the protruding portion 52 are respectively coupled to the fixed end 51 and the free end 53. The fixed end 51 is fixed on the inner side of the second side plate 13. The protruding portion 52 protrudes away from the second side plate 13 by a predetermined distance and can be deformed. The free end 53 is attached to the inner side of the second side plate 13.

In one embodiment, the fixed portion 51, the protruding portion 52, and the free end 53 may be an integrally formed structure.

Figure 4:
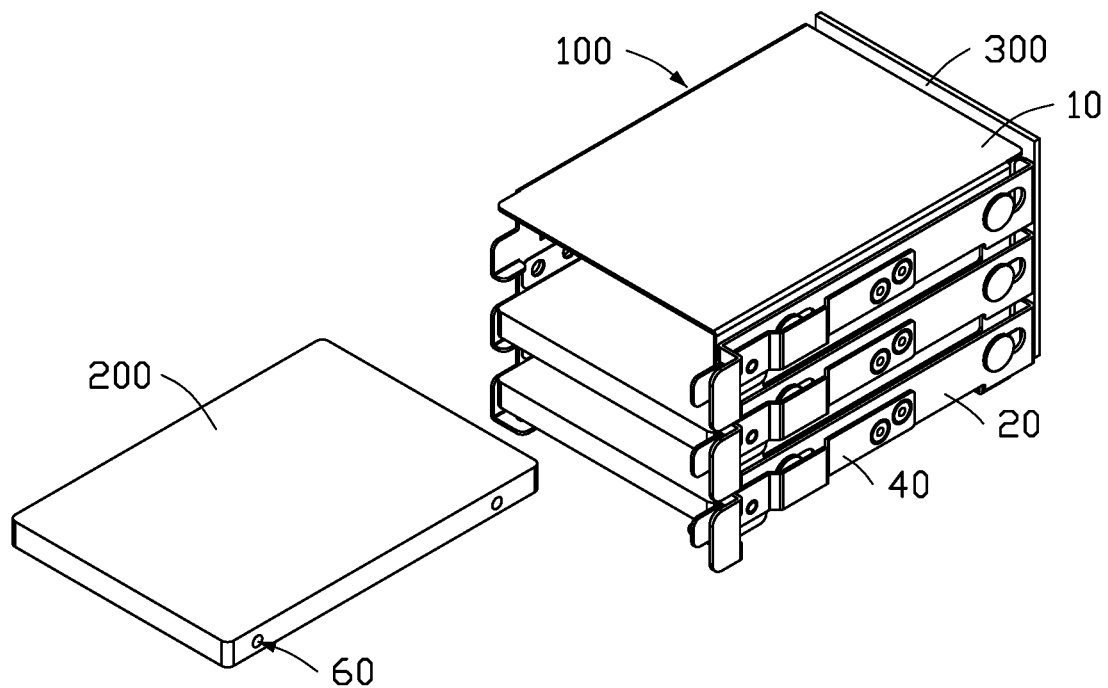
FIG. 4 is a schematic perspective diagram of a data storage device provided in the data storage device fixing structure.

Referring to FIG. 4, the data storage device 200 defines a third fixing hole 60 corresponding to the first fixing hole 122 and the second fixing hole 211, so that the fixing portion 42 extends into the data storage device 200 through the third fixing hole 60. Further, the data storage device 200 is a solid-state hard disk, and it is understood that in other embodiments, the data storage device 200 may be other types of hard disks or other structures.

Figure 5:
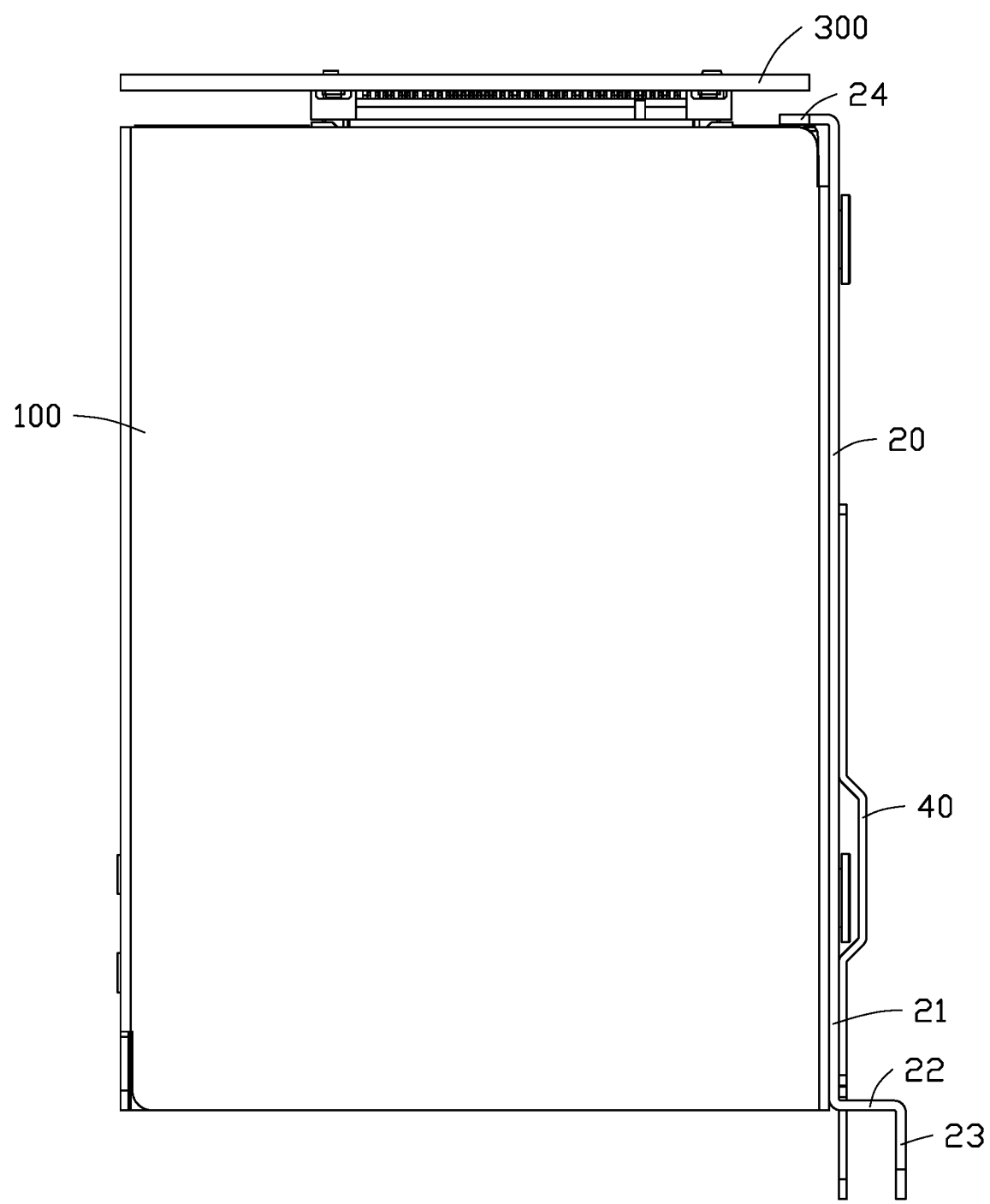
FIG. 5 is a top view of the data storage device installed in the data storage device fixing structure and coupled to a connector.

Referring to FIGS. 4 and 5, in one embodiment, the data storage device 200 with a height of 7 mm is fixed in the data storage device fixing structure 100 and coupled to a connector 300. A vertical direction is the height direction, which is perpendicular to the cover 11. In order to facilitate understanding of the connection between the data storage device 200 and the connector 300, the cover 11 of the mounting frame 10 is removed in FIG. 5.

When the data storage device 200 is installed in the data storage device fixing structure 100, the data storage device 200 is supported on the support plate 15, and the resilient member 50 resists against the upper end of the data storage device 200, and the fixing portion 42 extends into the data storage device 200. A rear end of the data storage device 200 is coupled to the connector 300. In one embodiment, the connector 300 is a cable connector. It can be understood that, in other embodiments, the connector 300 is not limited to this and may also be a backplane.

Figure 6:
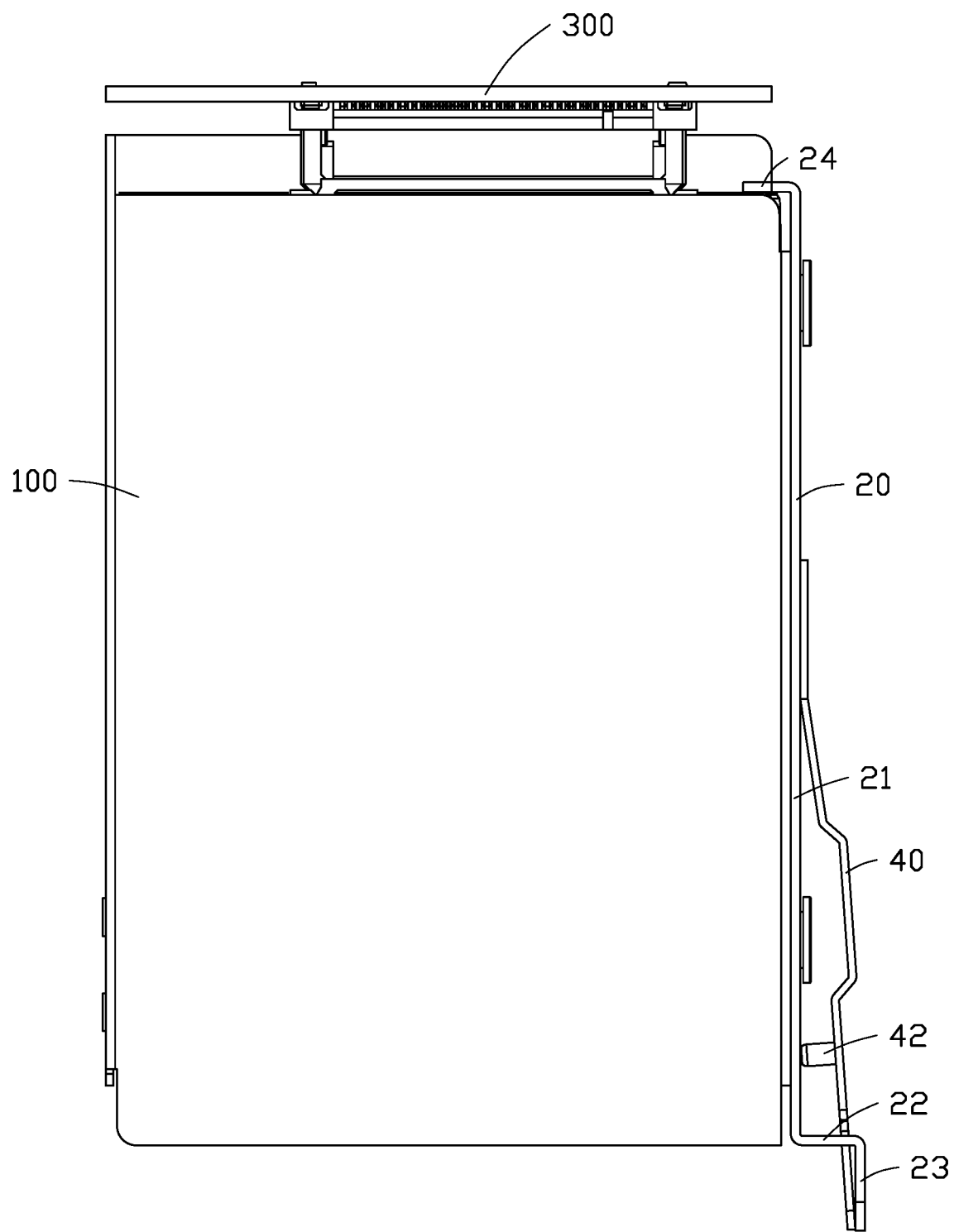
FIG. 6 is similar to FIG. 5, but showing the data storage device detached from the connector.

FIG. 6 illustrates a process of detaching the data storage device 200 from the data storage device fixing structure 100. The cover 11 is removed in FIG. 6.

First, the end of the limiting member 40 is moved in a direction away from the data storage device 200, so that the fixing portion 42 is separated from the data storage device 200. The end of the limiting member 40 moves in the through hole 221. At the same time, the end of the limiting member 40 can be moved with the help of the operating portion 23.

Then, the resisting member 20 is pulled away from the connector 300, which causes the resisting member 20 to drive the limiting member 40 to move, and the fixing portion 42 is received in the positioning portion 123 to position the limiting member 40. At the same time, the resisting portion 24 on the limiting member 40 drives the data storage device 200 to move, so that the data storage device 200 is separated from the connector 300. At this time, the data storage device 200 is detached from the connector 300.

Finally, the unlocked data storage device 200 is taken out from the data storage device fixing structure 100.

To fixedly couple the data storage device 200 to the connector 300, the data storage device 200 is first pushed into the mounting frame 10 along the support plates 15. When the rear end of the data storage device 200 contacts the resisting portion 24, the data storage device 200 is further pushed to drive the first body 21 to move along the first side plate 12, thereby driving the limiting member 40 to move. Then, the fixing portion 42 is moved out of the positioning portion 123 until the fixing portion 42 passes through the first fixing hole 122 and the second fixing hole 211 and extends into the third fixing hole 60 of the data storage device 200, thereby fixing the data storage device 200, and the data storage device 200 is inserted into the connector 300.

Figure 7:
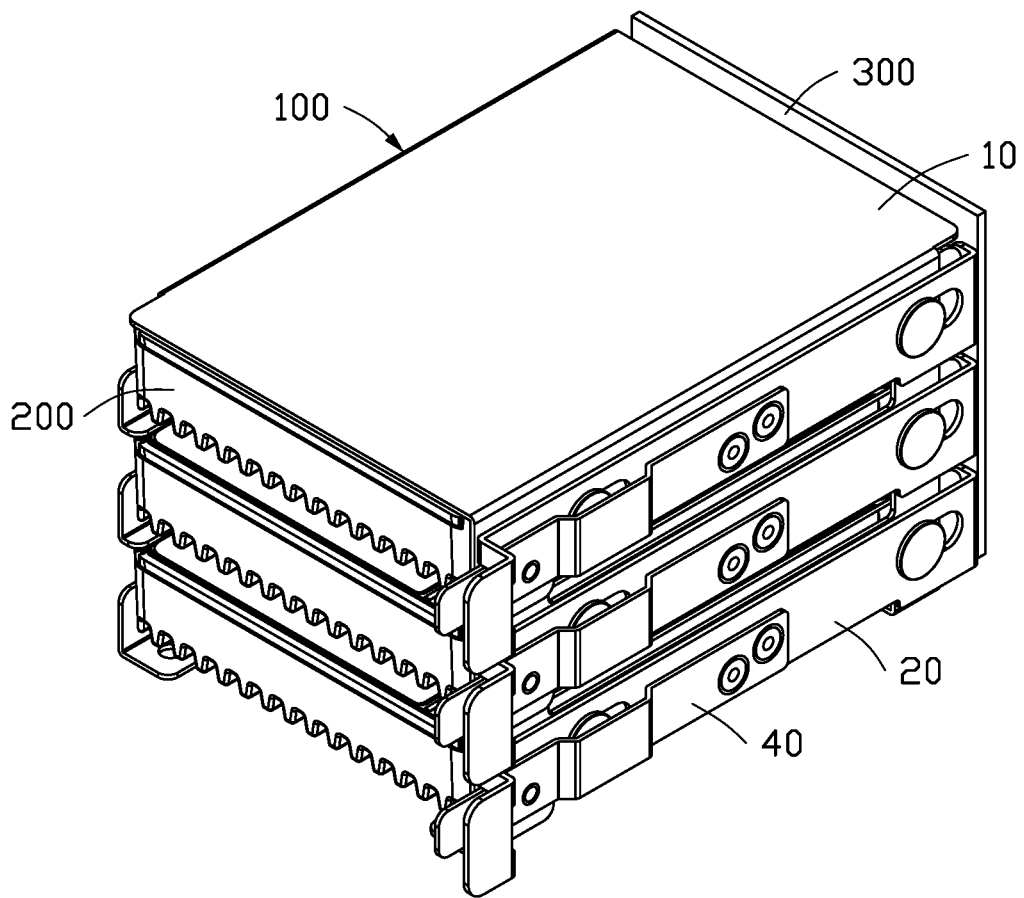
FIG. 7 is a schematic perspective diagram of the data storage device fixing structure provided with a data storage device of a different size.

FIG. 7 shows a data storage device 200 of another size fixedly mounted in the data storage device fixing structure 100. Specifically, the data storage device 200 is a data storage device 200 with a height of 15 mm. When the data storage device 200 is fixed, the fixing portion 42 extends into the data storage device 200, and the edge of the data storage device resists the resilient member 50, which presses the protruding portion 52 toward the inner side of the second side plate 13 and causes the free end 53 to move toward the rear. Because the protruding portion 52 can provide a certain restoring force, the data storage device 200 is held tightly, and the data storage device 200 is fixed together with the fixing portion 42.

The method of fixing and detaching the data storage device 200 is the same as that of the 7 mm data storage device 200, and will not be repeated here. The resilient member 50 can fix the data storage device 200 of different sizes, which increases the versatility of the data storage device fixing structure 100.

It can be understood that, in other embodiments, the resisting member 20 and the limiting member 40 may also be provided on the second side plate 13 so as to cooperate with the resisting member 20 and the limiting member 40 on the first side plate 12. In this embodiment, the resilient member 50 may be omitted, and a corresponding fixing hole is defined in the data storage device 200.

Figure 8:
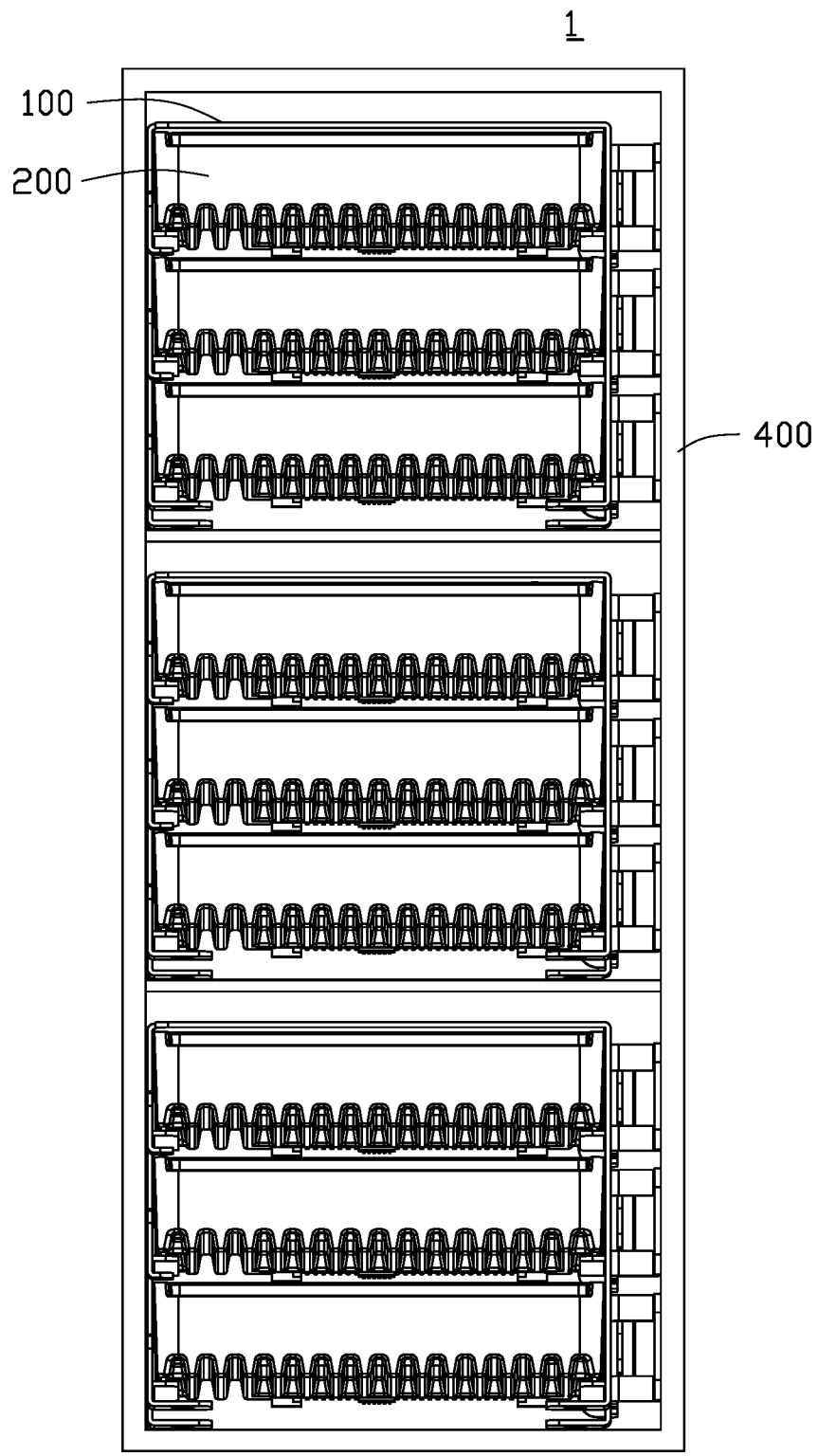
FIG. 8 is a schematic view of an embodiment of a cabinet.

FIG. 8 shows an embodiment of a cabinet 1 including a cabinet body 400, and the data storage device fixing structure 100 and the connector 300 are provided in the cabinet body 400.

The cabinet body 400 also houses other structures coupled to the data storage device 200 and the connector 300, so that the data storage device 200 and the connector 300 can operate. For example, the cabinet body 400 is also provided with a power supply and a controller, which will not be described here.

In summary, by arranging the resisting member 20 and the limiting member 40 outside the mounting frame 10, structures such as screws and studs are not needed. The data storage device 200 can be fixedly mounted to prevent the data storage device 200 from moving during the connection with the connector 300. In addition, when the data storage device 200 is taken out of the data storage device fixing structure 100, the data storage device 200 can be detached from the connector 300 by operating the resisting member 20 without any disassembly tools, which greatly saves fixing and disassembly time. The data storage device fixing structure 100 can fix data storage devices 200 of different sizes and has strong versatility. The cabinet 1 adopting the data storage device fixing structure 100 can fix more data storage devices 200 and improve installation efficiency.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A data storage device fixing structure, comprising:
a mounting frame comprising a first side plate;
a resisting member movably arranged on the first side plate of the mounting frame, the resisting member comprising a first body, a connecting portion arranged at a front end of the first body and perpendicular to the first body, and a resisting portion arranged at a rear end of the first body and perpendicular to the first body, wherein the resisting portion is configured to resist a data storage device; and
a limiting member located on a surface of the resisting member facing away from the first side plate, the limiting member provided with a fixing portion;
wherein:
the fixing portion extends into the data storage device located in the mounting frame to fixedly mount the data storage device;
the connecting portion defines a through hole, an end of the limiting member extends through the through hole; and
when the end of the limiting member is moved in the through hole, the fixing portion is separated from the data storage device, the resisting member is pulled, and the resisting portion drives the data storage device to move.

2. The data storage device fixing structure of claim 1, wherein:
the mounting frame further comprises a cover and a second side plate;
the first side plate and the second side plate are respectively arranged on opposite sides of the cover; and
the cover, the first side plate, and the second side plate form an accommodating space for accommodating the data storage device.

3. The data storage device fixing structure of claim 2, wherein:
a sliding structure is provided between the resisting member and the first side plate.

4. The data storage device fixing structure of claim 3, wherein:
a sliding groove is defined in the resisting member;
a protrusion is provided on the first side plate; and
the protrusion is received in the sliding groove.

5. The data storage device fixing structure of claim 1, wherein:
the resisting member further comprises a first body, a connecting portion, and an operating portion;

two ends of the connecting portion are coupled to the first body and the operating portion, respectively; and the resisting portion is provided at an end of the first body away from the operating portion.

6. The data storage device fixing structure of claim 1, wherein:

a positioning portion is provided on the mounting frame for positioning the fixing portion.

7. The data storage device fixing structure of claim 1, wherein:

the mounting frame is provided with a support plate and a resilient member;

the support plate supports the data storage device; and the resilient member fixes the data storage device on the support plate.

8. The data storage device fixing structure of claim 7, wherein:

the resilient member is elastically deformable.

9. A cabinet comprising: a cabinet body; a connector provided in the cabinet body; and a data storage device fixing structure provided in the cabinet body and configured to fixedly mount a data storage device to the connector, the data storage device Ung structure, comprising: a mounting frame comprising a first side plate; a resisting member movably arranged on the first side plate of the mounting frame, the resisting member comprising a first body, a connecting portion arranged at a front end of the first body and perpendicular to the first body, and a resisting portion arranged at a rear end of the first body and perpendicular to the first body, wherein the resisting portion is configured to resist the data storage device; and a limiting member located on a surface of the resisting member facing away from the first side plate, the limiting member provided with a fixing portion; wherein: the fixing portion extends into the data storage device boated in the mounting frame to fixedly mount the data storage device; the connecting portion defines a through hole, an end of the limiting member extends through the through hole; and when the end of the limiting member is moved in the through hole, the fixing portion is separated from the data storage device, the resisting member is pulled, and the resisting portion drives the data storage device to move to detach from the connector.

10. The cabinet of claim 9, wherein:

the mounting frame further comprises a cover and a second side plate;

the first side plate and the second side plate are respectively arranged on opposite sides of the cover; and the cover, the first side plate, and the second side plate form an accommodating space for accommodating the data storage device.

11. The cabinet of claim 10, wherein:

a sliding structure is provided between the resisting member and the first side plate.

12. The cabinet of claim 11, wherein:

a sliding groove is defined in the resisting member;

a protrusion is provided on the first side plate; and the protrusion is received in the sliding groove.

13. The cabinet of claim 9, wherein:

the resisting member further comprises an operating portion;

two ends of the connecting portion are coupled to the first body and the operating portion, respectively; and the resisting portion is provided at an end of the first body away from the operating portion.

14. The cabinet of claim 9, wherein:

a positioning portion is provided on the mounting frame for positioning the fixing portion.

15. The cabinet of claim 9, wherein:

the mounting frame is provided with a support plate and a resilient member;

the support plate supports the data storage device; and the resilient member fixes the data storage device on the support plate.

16. The cabinet of claim 15, wherein:

the resilient member is elastically deformable.

* * * * *